(12) United States Patent
Itoda (10) Patent No.: US 11,811,553 B2
(45) Date of Patent: Nov. 7, 2023

(54) VEHICLE RELAY DEVICE

(71) Applicant: DENSO CORPORATION, Kariya (JP)

(72) Inventor: Shuhei Itoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 272 days.

(21) Appl. No.: 17/197,734

(22) Filed: Mar. 10, 2021

(65) Prior Publication Data

US 2021/0194726 A1 Jun. 24, 2021

Related U.S. Application Data (63) Continuation of application No. PCT/JP2019/033489, filed on Aug. 27, 2019.

(30) Foreign Application Priority Data

Sep. 14, 2018 (JP) ................. 2018-172717

(51) Int. Cl.
*H04L 12/46* (2006.01)
*B60R 16/023* (2006.01)
*H04L 12/40* (2006.01)
*H04L 9/40* (2022.01)

(52) U.S. Cl.
CPC ...... *H04L 12/4604* (2013.01); *B60R 16/0231* (2013.01); *H04L 12/40013* (2013.01); *H04L 63/0236* (2013.01); *H04L 2012/40215* (2013.01); *H04L 2012/40273* (2013.01)

(58) Field of Classification Search
CPC ........... H04L 12/4604; H04L 12/40013; H04L 63/0236; H04L 2012/40215; H04L 2012/40273; H04L 2209/84; H04L 9/3271; H04L 63/101; H04L 63/08; B60R 16/0231; H04W 4/48
See application file for complete search history.

(56) References Cited

U.S. PATENT DOCUMENTS

| | | | |
|---|---|---|---|
| 2014/0096183 A1 | 4/2014 | Jain et al. | |
| 2015/0326529 A1* | 11/2015 | Morita | G06F 21/6218 726/12 |
| 2016/0006769 A1 | 1/2016 | Jain et al. | |
| 2017/0272442 A1* | 9/2017 | Klimovs | H04L 63/101 |
| 2017/0300229 A1* | 10/2017 | Jakkula | G06F 3/0652 |
| 2017/0339153 A1* | 11/2017 | Isola | H04L 63/101 |
| 2018/0007005 A1* | 1/2018 | Chanda | H04L 63/0263 |
| 2019/0229948 A1 | 7/2019 | Iwata et al. | |

FOREIGN PATENT DOCUMENTS

| JP | 2016500937 A | 1/2016 |
|---|---|---|
| JP | 2018056679 A | 4/2018 |

* cited by examiner

*Primary Examiner* — Hardikkumar D Patel
(74) *Attorney, Agent, or Firm* — Harness, Dickey & Pierce, P.L.C.

(57) ABSTRACT

A vehicle relay device includes a plurality of communication ports. Each of the plurality of communication ports communicate with a communication device as a node in accordance with an Ethernet standard. A connection permission node that is a node to be connected is predefined for each of the plurality of communication ports. The vehicle relay device does not communicate with an unregistered node that is a node not registered as the connection permission node.

6 Claims, 8 Drawing Sheets

| RULE ID | CONTENT | APPLICATION PORT |
|---|---|---|
| 1 | PASS THROUGH COMMUNICATION FRAME IN WHICH DESTINATION OR SOURCE IS NODE 1a | #1 |
| 2 | PASS THROUGH COMMUNICATION FRAME IN WHICH DESTINATION OR SOURCE IS NODE 1b | #2 |
| 3 | PASS THROUGH COMMUNICATION FRAME IN WHICH DESTINATION OR SOURCE IS NODE 1c | #3 |
| 4 | PASS THROUGH COMMUNICATION FRAME IN WHICH DESTINATION OR SOURCE IS RELAY DEVICE 2b | #4 |
| 5-96 | (NOT SET) | – |
| 97 | PASS THROUGH BROADCAST FRAME | #1, #2, #3, #4 |
| 98 | DOES NOT ALLOW ANY FRAME TO PASS THROUGH (any deny) | #1, #2, #3, #4, #5, #6 |
| 99 | PASS THROUGH ALL FRAME (any permit) | – |

FIG. 4

| PORT NUMBER | APPLICATION RULE |
|:---:|:---:|
| #1 | 1 > 97 > 98 |
| #2 | 2 > 97 > 98 |
| #3 | 3 > 97 > 98 |
| #4 | 4 > 97 > 98 |
| #5 | 98 |
| #6 | 98 |

| PORT NUMBER | APPLICATION RULE |
|---|---|
| #1 | 1 > 97 > 98 |
| #2 | 2 > 97 > 98 |
| #3 | 3 > 97 > 98 |
| #4 | 4 > 97 > 98 |
| #5 (TARGET PORT →) | 99 > 98 |
| #6 | 98 |

FIG. 7

| PORT NUMBER | APPLICATION RULE |
|---|---|
| #1 | 1 > 97 > 98 |
| #2 | 2 > 97 > 98 |
| #3 | 3 > 97 > 98 |
| #4 | 4 > 97 > 98 |
| #5 (TARGET PORT →) | 99 |
| #6 | 98 |

FIG. 8

| RULE ID | CONTENT | APPLICATION PORT |
|---|---|---|
| 1 | PASS THROUGH COMMUNICATION FRAME IN WHICH DESTINATION OR SOURCE IS NODE 1a | #1 |
| 2 | PASS THROUGH COMMUNICATION FRAME IN WHICH DESTINATION OR SOURCE IS NODE 1b | #2 |
| 3 | PASS THROUGH COMMUNICATION FRAME IN WHICH DESTINATION OR SOURCE IS NODE 1c | #3 |
| 4 | PASS THROUGH COMMUNICATION FRAME IN WHICH DESTINATION OR SOURCE IS RELAY DEVICE 2b | #4 |
| 5 | PASS THROUGH COMMUNICATION FRAME IN WHICH DESTINATION OR SOURCE IS NODE 1x | #5 |
| 6-96 | (NOT SET) | – |
| 97 | PASS THROUGH BROADCAST FRAME | #1, #2, #3, #4, #5 |
| 98 | DOES NOT ALLOW ANY FRAME TO PASS THROUGH (any deny) | #1, #2, #3, #4, #5, #6 |
| 99 | PASS THROUGH ALL FRAME (any permit) | – |

FIG. 9

| PORT NUMBER | APPLICATION RULE |
|---|---|
| #1 | 1 > 97 > 98 |
| #2 | 2 > 97 > 98 |
| #3 | 3 > 97 > 98 |
| #4 | 4 > 97 > 98 |
| #5 | 5 > 97 > 98 |
| #6 | 98 |

TARGET PORT → #5

FIG. 10

| RULE ID | CONTENT | APPLICATION PORT |
|---|---|---|
| ... | ... | ... |
| 99 | PASS THROUGH ARP REQUEST (REGARDLESS OF SOURCE) | — |

FIG. 11

| RULE ID | CONTENT | APPLICATION PORT |
|---|---|---|
| ... | ... | ... |
| 99 | PASS THROUGH COMMUNICATION FRAME HAVING SOURCE ADDRESS WITHIN PREDETERMINED RANGE | — |

US 11,811,553 B2

VEHICLE RELAY DEVICE

CROSS REFERENCE TO RELATED APPLICATIONS

The present application is a continuation application of International Patent Application No. PCT/JP2019/033489 filed on Aug. 27, 2019, which designated the U.S. and claims the benefit of priority from Japanese Patent Application No. 2018-172717 filed on Sep. 14, 2018. The entire disclosures of all of the above applications are incorporated herein by reference.

TECHNICAL FIELD

The present disclosure relates to a relay device constituting a communication network in a vehicle.

BACKGROUND

In recent years, Ethernet has been introduced as a communication network in a vehicle from the viewpoint of improvement of communication speed. Ethernet is a registered trademark.

SUMMARY

The present disclosure provides a vehicle relay device. The vehicle relay device includes a plurality of communication ports. Each of the plurality of communication ports communicate with a communication device as a node in accordance with an Ethernet standard. A connection permission node that is a node to be connected is predefined for each of the plurality of communication ports. The vehicle relay device does not communicate with an unregistered node that is a node not registered as the connection permission node.

BRIEF DESCRIPTION OF DRAWINGS

The features and advantages of the present disclosure will become more apparent from the following detailed description made with reference to the accompanying drawings. In the drawings.

DETAILED DESCRIPTION

It is necessary to ensure security of communication network constituted in a vehicle (hereinafter referred to as an in-vehicle network). For example, for ensuring security, a connectable node is registered in advance as a connection permission node for each port of the relay device using an ACL (Access Control List) or the like.

According to the configuration in which the connection permission node is registered in advance for each port of the relay device, a node that is not registered as the connection permission node (hereinafter, an unregistered node) cannot connect to the relay device, and cannot join the in-vehicle network via the relay device. Here, "cannot connect to the relay device" does not mean a state in which physical connection cannot be made, but means a state in which communication with other nodes including the relay device cannot be performed even when physical connection is made.

Thus, according to the configuration in which the connection permission node is registered in advance for each port of the relay device, it is possible to reduce the possibility that a suspicious node connects to the in-vehicle network via the relay device. However, in the configuration in which the only pre-registered connection permission node can be connected to the relay device, it is difficult to additionally connect a new node to the relay device, for example, after factory shipment in order to improve the function of the vehicle. Further, when it is necessary to replace the node due to a failure or the like, it is also difficult to connect an alternative node to the in-vehicle network.

The ACL described above corresponds to a list for a condition of communication frame for permitting passage and a condition of communication frame for denying the passage. Such an ACL can function as a list of node that are permitted to connect to the in-vehicle network and nodes that are prohibited from connecting to the in-vehicle network.

The present disclosure provides a vehicle relay device that ensures security of in-vehicle network and is capable of connecting a new node to the in-vehicle network.

An exemplary embodiment of the present disclosure provides a vehicle relay device. The vehicle relay device includes a plurality of communication ports, a relay processing unit, a release device port, a release authentication unit, a target port acquisition unit, a connection condition easing unit, and a node addition processing unit. Each of the plurality of communication ports communicate with a communication device as a node in accordance with an Ethernet standard. A connection permission node that is a node to be connected is predefined for each of the plurality of communication ports. The relay processing unit does not communicate with an unregistered node that is a node not registered as the connection permission node. The release device port is a communication port for wiredly connecting a release device. The release authentication unit determines whether a connection device connected to the release device port is the release device by communicating with the connection device. The target port acquisition unit acquires, from the connection device as the release device, a number for a target port that is a communication port to which the unregistered node as a new node is connected. The connection condition easing unit changes an operation setting of the relay processing unit for communicating with the unregistered node via the target port when the release authentication unit determines that the release device is connected to the release device port. The node addition processing unit acquires information on the new node by communicating with the new node via the target port, and registers the new node as the connection permission node for the target port.

In the exemplary embodiment of the present disclosure, the vehicle relay device does not communicate with the unregistered node, when the release device is not connected to the release device port. Thus, the security of the in-vehicle network can be ensured.

In addition, when the release device is connected to the release device port, the vehicle relay device transitions to a state where the target port can communicate with the unregistered node. The vehicle relay device registers the new node, as the connection permission node for the target port, by communicating with the new node through the target port. Thus, even when it is necessary to additionally connect a new node to the relay device in order to improve the function of the vehicle after shipment from the factory or even when it is necessary to replace a node due to a failure or the like, the configuration can flexibly (that is, dynamically) connect the new node to the in-vehicle network through the relay device.

Figure 1:
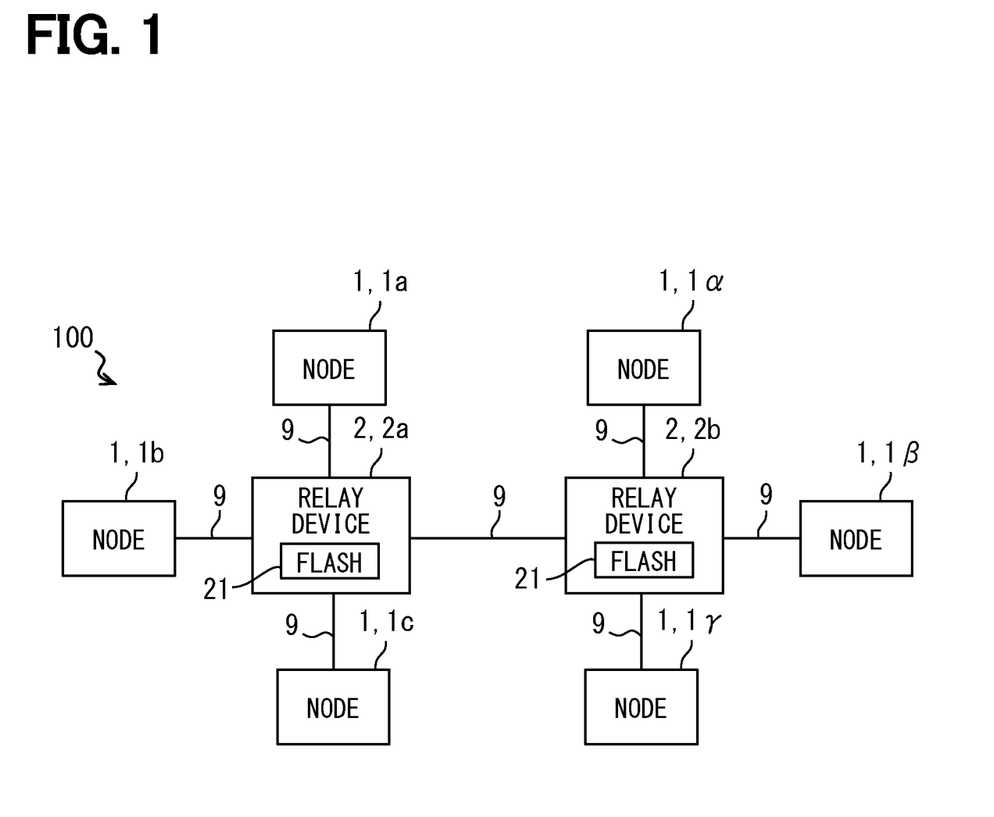
FIG. 1 is a diagram showing a configuration of an in-vehicle communication system.

Hereinafter, embodiments of the present disclosure will be described with reference to the drawings. FIG. 1 is a diagram showing a configuration example of an in-vehicle communication system 100 according to the present disclosure. The in-vehicle communication system 100 is a communication system built in a vehicle. The in-vehicle communication system 100 of this embodiment is configured according to the in-vehicle Ethernet standard. Hereinafter, data communication in accordance with the Ethernet communication protocol is referred to as Ethernet communication. Further, a communication frame refers to a communication frame in accordance with the Ethernet communication protocol (so-called Ethernet frame).

The in-vehicle communication system 100 includes a plurality of nodes 1 and at least one relay device 2. The in-vehicle communication system 100 shown in FIG. 1 includes six nodes 1 and two relay devices 2 as an example. When distinguishing between the two relay devices 2, the two relay devices 2 are described as relay devices 2a and 2b. When distinguishing each of the six nodes 1, the six nodes 1 are described as the nodes 1a to 1c and 1a to 1y. The relay device 2 corresponds to a vehicle relay device.

Each of the nodes 1a to 1c is connected to the relay device 2a via a communication cable 9 so as to be able to communicate with each other. Each of the nodes 1a to 1y is connected to the relay device 2b via a communication cable 9 so as to be able to communicate with each other. The relay device 2a and the relay device 2b are also connected to each other so as to be able to communicate with each other via the communication cable 9. The cable 9 may be a twisted pair cable.

The number of nodes 1 and relay devices 2 constituting the in-vehicle communication system 100 is an example, and can be changed as appropriate. Further, the network topology of the in-vehicle communication system 100 shown in FIG. 1 is an example and is not limited thereto. The network topology of the in-vehicle communication system 100 may be a mesh type, a star type, a bus type, a ring type, or the like. The network shape can also be changed as appropriate.

The node 1 is, for example, an ECU (Electronic Control Unit). For example, the node 1a is an ECU that provides an autonomous driving function (so-called autonomous driving ECU). The node 1b is an ECU that acquires a program for updating a software of an ECU by wirelessly communicating with an external server and updates the software of the ECU to which the program is applied. The node 1c is an ECU that provides a smart entry function. The relay devices 2 can be connected with the ECU that provide various functions as the node 1.

Each node 1 performs transmission and reception of data with another node 1 via the relay device 2 in accordance with the Ethernet communication protocol. Each node 1 directly communicates with the relay device 2. The node 1 connected to the relay device 2 may be a camera imaging the outside of the vehicle, a distance measure sensor, or the like which is other than the ECU. The node 1 indicates a communication device capable of performing communication in accordance with the Ethernet standard. Further, the relay device 2 also corresponds to a node in the communication network from another viewpoint. For example, for the relay device 2a, the relay device 2b corresponds to one of the nodes connected to the relay device 2a. Unique identification information (MAC address) is designated to each of the nodes 1 and the relay devices 2.

Figure 2:
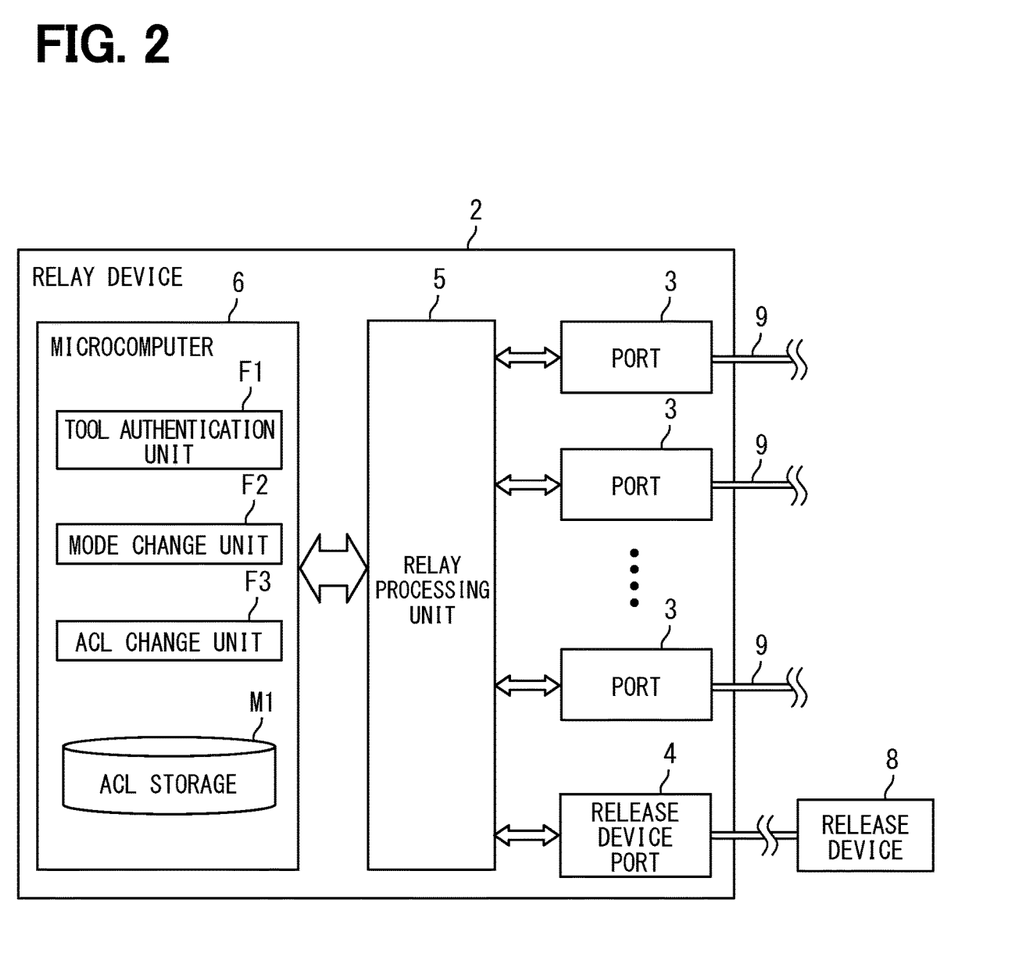
FIG. 2 is a diagram showing an exemplary configuration of a relay device.

The relay device 2 is a device that transmits a communication frame received from a certain communication cable 9 to another communication cable 9 according to the destination of the communication frame. The relay device 2 provides a communication network (that is, an in-vehicle network) that connects the nodes 1 mounted on the vehicle. As shown in FIG. 2, the relay device 2 includes a plurality of ports 3, a release device port 4, a relay processing unit 5, and a microcomputer 6. The relay processing unit 5 is also referred to as a relay processor.

The port 3 is electrically and physically connected to the Ethernet communication cable 9 and provides a physical layer in the OSI reference model. The number of ports 3 included in the relay device 2 corresponds to the number of nodes 1 to which the relay device 2 can be directly connected. As an example, the relay device 2 of the present embodiment includes six ports 3 so as to enable Ethernet communication with a maximum of six nodes 1. As another configuration, the number of ports 3 included in the relay device 2 may be four or eight. The port 3 corresponds to a communication port.

A unique port number is set for each of the plurality of ports 3 included in the relay device 2. For convenience, when a plurality of ports 3 included in the relay device 2 are distinguished, the port number K set in the port 3 is used for being described as the Kth port. For example, the first port 31 refers to the port 3 whose port number is set to 1, and the second port 32 refers to the port 3 whose port number is set to 2. The relay device 2 of the present embodiment includes first port 31 to sixth port 36.

The port 3 converts a signal input from the communication cable 9 into a digital signal that can be processed by the relay processing unit 5 and outputs the digital signal to the relay processing unit 5. Further, the port 3 converts a digital signal input from the relay processing unit 5 into an analog signal that can be transmitted to the communication cable 9 and outputs the analog signal. The port 3 is provided by an IC including an analog circuit. That is, the port 3 is a hardware circuit. Such port 3 includes, for example, a packaged as a PHY chip for in-vehicle Ethernet. Each of the ports 3 and the relay processing unit 5 (specifically, MAC unit) communicate with each other in accordance with the media independent interface (MII) standard, as will be described later.

The release device port 4 is a port for connecting a release device 8 which will be described later. The roles and operations of the release device port 4 and the release device 8 will be described later. Various communication standards such as Ethernet and USB can be adopted as the communication standard between the release device port 4 and the release device 8.

The relay processing unit 5 is connected to each of the plurality of ports 3 and is also connected to the microcomputer 6 so as to be able to communicate with each other. The relay processing unit 5 is programmed to execute functions of a second layer (data link layer) to a third layer (so-called network layer) in the OSI reference model. Specifically, the relay processing unit 5 includes a MAC unit, a switch processing unit, and a third layer provision unit. The MAC unit performs Medium Access Control in the Ethernet communication protocol. The MAC unit is prepared for each of the plurality of ports 3.

The switch processing unit identifies the port 3 to which the communication frame received from the MAC unit is to be transmitted based on the destination MAC address invehicle network and the address table. Then, the reception frame is relayed by outputting the communication frame to the MAC unit corresponding to the identified port 3. The address table is data indicating the MAC address of the node 1 connected to each port 3.

The MAC address for each port 3 connected to the node 1 is learned by various methods such as learning bridge and ARP (Address Resolution Protocol). A detailed description of the method of generating the address table will be omitted. The microcomputer 6 may be provided with the function of learning the MAC address of the connection destination for each port 3 (hereinafter, the address table update function). The third layer provision unit performs relay processing using an IP (Internet Protocol) address. In other words, the third layer provision unit relays communication frames between different networks. The function of the third layer in the OSI reference model may be provided in the microcomputer 6. The functional arrangement in the relay device 2 can be changed as appropriate.

The relay processing unit 5 is realized by using, for example, an FPGA (field-programmable gate array). The relay processing unit 5 may be realized by using an ASIC (application specific integrated circuit). Further, the relay processing unit 5 may be realized by using an MPU, a CPU, or a GPU. The relay processing unit 5 having the above-described functions corresponds to a configuration that operates as a switch (in other words, a switching hub) or a router. The relay processing unit 5 operates according to the ACL described later.

The microcomputer 6 is a computer including a CPU, a flash memory 21, a RAM, an I/O, and a bus line for connecting these components. The ROM stores a program for causing a general-purpose computer to function as the microcomputer 6. The microcomputer 6 provides the functions as the fourth layer to the seventh layer of the OSI reference model by the CPU executing the program stored in the flash memory 21 while using the temporary storage function of the RAM.

Further, the microcomputer 6 includes a tool authentication unit F1, a mode change unit F2, and an ACL change unit F3 as functional blocks by executing a program stored in the flash memory 21 (hereinafter, a relay device program). In addition, the microcomputer 6 includes an ACL storage unit M1. The ACL storage unit M1 stores an ACL (Access Control List) indicating a condition of the communication frame for passing through the relay device 2 and a condition of the communication frame for not passing through the relay device 2. The ACL storage unit M1 can be realized by using, for example, a part of the storage area included in the flash memory 21. The ACL storage unit M1 may be realized by using a non-volatile and rewritable storage medium independent of the flash memory 21.

The tool authentication unit F1, the mode change unit F2, and the ACL change unit F3 connect a new node to the relay device 2. Connecting a new node to the relay device 2 is equivalent to adding a new node to the in-vehicle network. The operations of the tool authentication unit F1, the mode change unit F2, and the ACL change unit F3, and the technical significance of the ACL will be described later. The storage medium for storing the relay device program is not limited to the flash memory 21. The relay device program may be stored in a non-transitory tangible storage medium.

(ACL)

Hereinafter, for convenience, the ACL will be described by taking the relay device 2*a* as an example. It is assumed that each port 3 provided in the relay device 2*a* is configured as below. A node 1*a* is connected to the first port 31. A node 1*b* is connected to the second port 32. A node 1*c* is connected to the third port 33. A relay device 2*b* is connected to the fourth port 34. Nodes are not connected to the fifth port 35 and the sixth port 36. That is, the fifth port 35 and the sixth port 36 are free ports.

As described above, the ACL indicating the condition for passing through the relay device 2 and the condition for not passing through the relay device 2 is set for each relay device 2 including the relay device 2*a*. The ACL includes a plurality of rules (hereinafter referred to as access control rules). The individual access control rule included in the ACL may indicate a condition of the communication frame for permitting the passage and a condition of the communication frame for denying the passage. As the elements constituting the access control rule, various elements such as a source MAC address, a destination MAC address, a communication frame type, and a protocol type can be adopted. Each of the plurality of access control rules is distinguished by a unique identification number (hereinafter, rule ID). The access control rule corresponds to a passage condition.

Each access control rule is configured so that the port 3 to be applied can be identified. Different combinations of access control rules are applied to each port 3 so that a predetermined node 1 can be connected. In other words, the ACL in this embodiment functions as a list of the node in which connection to the relay device 2 is permitted and the node in which connection is denied.

Figure 3:
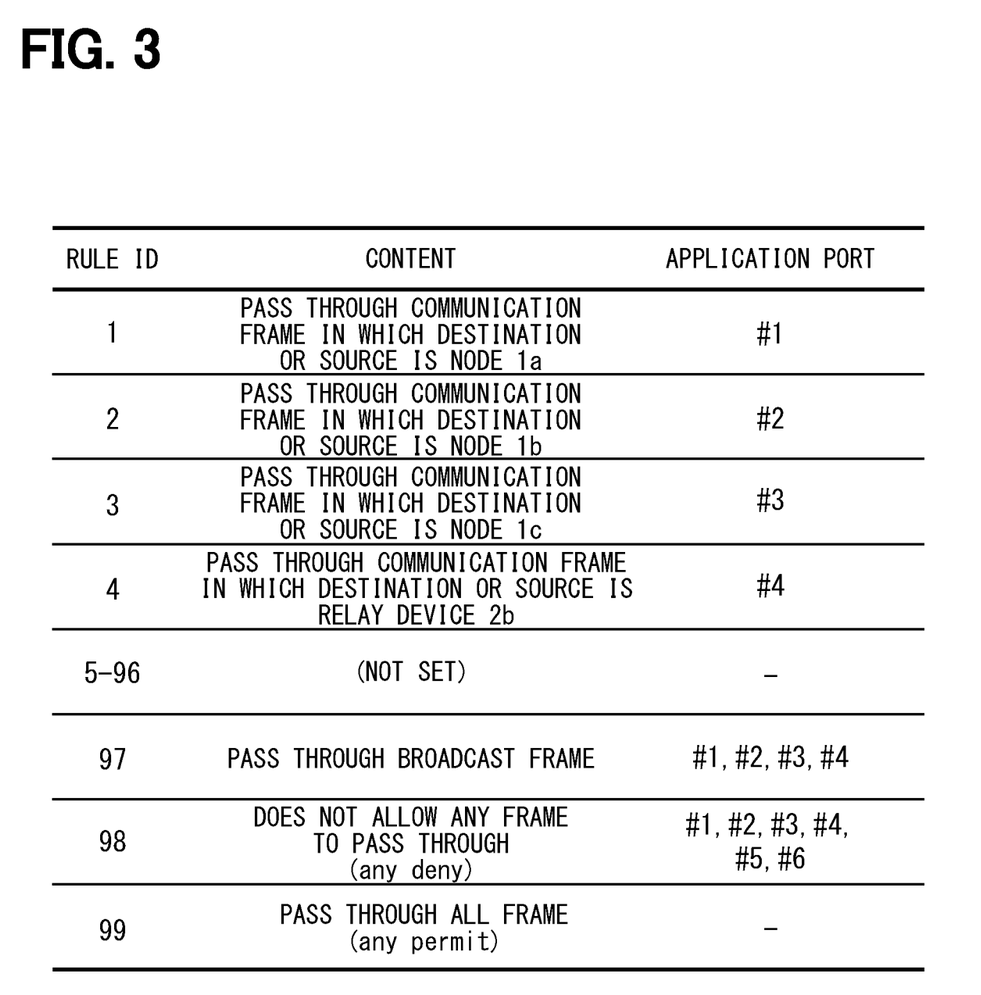
FIG. 3 is a diagram showing an example of an access control rule included in an ACL.

For example, in the relay device 2*a*, as shown in FIG. 3, the ACL includes the access control rules having the rule IDs 1 to 4 and 97 to 99. The access control rule with rule ID=1 passes a communication frame in which a destination or source is the node 1*a*. The access control rule with rule ID=2 passes a communication frame in which a destination or source is the node 1*b*. The identification of the destination or source of the node may be performed by the MAC address.

The access control rule with rule ID=3 passes a communication frame in which a destination or source is the node 1*c*. The access control rule with rule ID=4 passes a communication frame in which a destination or source is the relay device 2*b*. The access control rule for passing the communication frame in which the destination or source is the relay device 2*b* corresponds the access control rule for passing the communication frame in which the destination or source is each of the nodes 1*a* to 1*y*.

The access control rule with rule ID=97 passes the broadcast frame. The broadcast frame is a communication frame whose destination is all nodes, and the destination MAC address is a predetermined broadcast address (for example, all bits are 1). The access control rule with rule ID=98 does not permit to pass any communication frame. The access control rule that do not permit to pass any communication frame is also commonly referred to as "any deny" or "deny all". Hereinafter, the access control rule corresponding to the "any deny" is also described as an all denial rule. The access control rule with rule ID=99 passes all communication frames.

As described above, each access control rule can designate the port 3 to which the rule is applied. For example, the access control rule with rule ID=1 is applied to the first port 31. The access control rule with rule ID=2 is applied to the second port 32. The access control rule with rule ID=3 is applied to the third port 33. The access control rule with rule ID=4 is applied to the fourth port 34.

The access control rule with rule ID=97 is applied to the first port 31 to the fourth port 34 to which the node 1 is connected. The access control rule with rule ID=98 is applied to all ports 3. The access control rule with rule ID=99 is a rule for realizing the dynamic connection mode, and is not applied to any port 3 during normal operation.

Figure 4:
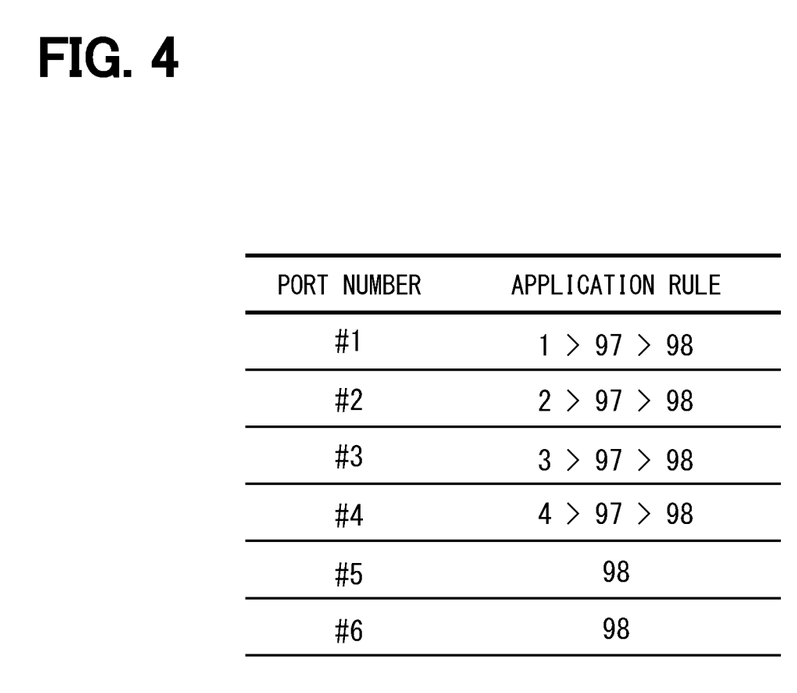
FIG. 4 is a diagram showing an access control rule applied to each port.

With the above settings, various access control rules are applied to each port of the relay device 2a as shown in FIG. 4. For example, the access control rules of rule ID=1, 97, 98 are applied to the first port 31. The various access control rules set in each port 3 have priorities according to the registration order and the like. The example shown in FIG. 4 shows that the rule on the left takes precedence over the rule on the right. For example, the access control rule with rule ID=1 is applied with the highest priority to the first port 31. Further, the access control rule with rule ID=97 is applied with priority over the access control rule with rule ID=98. When a rule with a higher priority (in other words, a condition) is applied, subsequent rules are not checked. Therefore, when the communication frame to be a target for the relay processing satisfies the access control rule of rule ID=1, the access control rule of rule IDs=97 and 98 is ignored for the first port 31.

Basically, various access control rules are set in each port 3 so that other rules take precedence over the all denial rule. For example, in the first port 31 to the fourth port 34, the access control rule for passing the broadcast frame (hereinafter, the broadcast passing rule) is set to have a higher priority than the all denial rule. Therefore, in the example shown in FIG. 4, the relay device 2 passes the broadcast frame through each port 3 from the first port 31 to the fourth port 34.

Further, in the example shown in FIG. 4, the all denial rule is applied to the fifth port 35 and the sixth port 36. Therefore, no communication frame such as a broadcast frame passes through the fifth port 35 and the sixth port 36. Therefore, even when a new node is connected to the fifth port 35, the node connected to the fifth port 35 is incapable of communicating with the relay device 2 or another node 1 unless the ACL is changed. The all denial rule may be applied to all ports 3 as an implicit rule without being explicitly stated. The all denial rule is usually applied to each port 3 as an access control rule with the lowest priority.

According to the above-described ACL setting, a predetermined node 1 can be connected to each port 3. Here, "cannot connect" does not mean a state in which physical connection cannot be made, but means a state in which communication with other nodes including the relay device 2 cannot be performed. For example, the node 1a can be connected to the first port 31 of the relay device 2a so as to communicate with other nodes, and the node 1b can be connected to the second port 32 so as to communicate with other nodes. The third port 33 and the fourth port 34 can also be connected to the node 1c and the relay device 2b, respectively. That is, the ACL of the present embodiment functions as a list that defines a node that is permitted to connect to the relay device 2 (hereinafter, connection permission nodes) for each port 3.

Here, as an example, 99 access control rules can be registered in one ACL, however the number of rules that can be registered in the ACL can be changed as appropriate. The numerical value of the rule ID shown in FIG. 3 is also an example and can be changed as appropriate. For example, the ID of the all denial rule may be set to 1. The number from 100 to 199 may be used as the rule IDs.

Further, a plurality of ACLs can be set in the relay device 2. The various rules shown in FIG. 3 may be registered separately in a plurality of ACLs. ACLs corresponding to each of the plurality of ports 3, such as an ACL for the first port 31, an ACL for the second port 32, and the like may be prepared. The plurality of ACLs can be identified by a unique identification number (ACL-ID). The ACL storage unit M1 included in each relay device 2 stores the ACL set in the relay device 2. The ACL storage unit M1 corresponds to an access control list storage unit.

(Tool Authentication Unit F1, Mode Change Unit F2, and ACL Change Unit F3)

Next, the tool authentication unit F1, the mode change unit F2, and the ACL change unit F3 will be described. The tool authentication unit F1 detects that the release device 8 is connected to the release device port 4. The release device 8 is a tool for temporarily releasing the network security of the in-vehicle communication system 100 (substantially, the relay device 2). The release of security here indicates that a node other than the connection permission node (hereinafter, an unregistered node) can be connected to the relay device 2. The state in which the unregistered node can connect to the relay device 2 indicates a state in which the unregistered node can communicate with the relay device 2 and the node 1. More specifically, the state in which the unregistered node can connect to the relay device 2 indicates a state in which the relay device 2 receives the communication frame transmitted by the unregistered node and the relay device 2 executes response processing or transfer processing according to the content of the received communication frame.

The release device 8 is, for example, a tool for updating or rewriting the software of a target ECU (so-called reprogramming tool) or a diagnostic tool. The release device 8 includes an HMI (Human Machine Interface) device such as a display and a touch panel so that the operator can identify the port 3 for connecting an unregistered node as a new node.

When a device is connected to the release device port 4, the tool authentication unit F1 determines whether the connected device is a predetermined release device 8 by executing an authentication processing by communicating with the connected device. As an authentication method for checking whether the connected device is the release device 8, various authentication methods such as a challenge-response method can be adopted. The tool authentication unit F1 corresponds to a release device authentication unit.

The mode change unit F2 changes the operation mode of the relay device 2. The relay device 2 of the present embodiment includes a secure mode and a dynamic connection mode as the operation modes. The secure mode performs the relay processing according to the ACL stored in the ACL storage unit M1. In other words, the secure mode is an operation mode in which the communication frame from the node 1 registered in advance is received or relayed.

Thus, even when a new node is connected to the free port 3 of the relay device 2 operating in the secure mode, the relay device 2 discards the communication frame transmitted from the new node by the ACL. Thus, even when the new node is connected to the relay device 2 operating in the secure mode, the now node is incapable of communicating with the existing node 1. The secure mode corresponds to an operation mode in which a new node cannot join the in-vehicle network. On the other hand, the dynamic connection mode is an operation mode for joining a new node to the in-vehicle network. In the dynamic connection mode, as will be described later, the access control rule for the predetermined port 3 is partially eased so that the new node can communicate with the relay device 2 and the like.

When the tool authentication unit F1 determines that the release device 8 is connected to the release device port 4, the mode change unit F2 sets the operation mode of the relay device 2 to the dynamic connection mode based on the request from the release device 8. When the tool authentication unit F1 does not determine that the release device 8 is connected to the release device port 4, the mode change unit F2 sets the operation mode of the relay device 2 to the secure mode.

The ACL change unit F3 rewrites the ACL stored in the ACL storage unit M1. When the relay device 2 is operating in the dynamic connection mode, the ACL change unit F3 changes the access control rule for the port 3 designated by the release device 8 based on the request from the release device 8. The ACL is an element that defines the operation mode of the relay processing unit 5. Changing the ACL corresponds to changing the operation setting of the relay processing unit 5.

(Registration Procedures for New Node)

Figure 5:
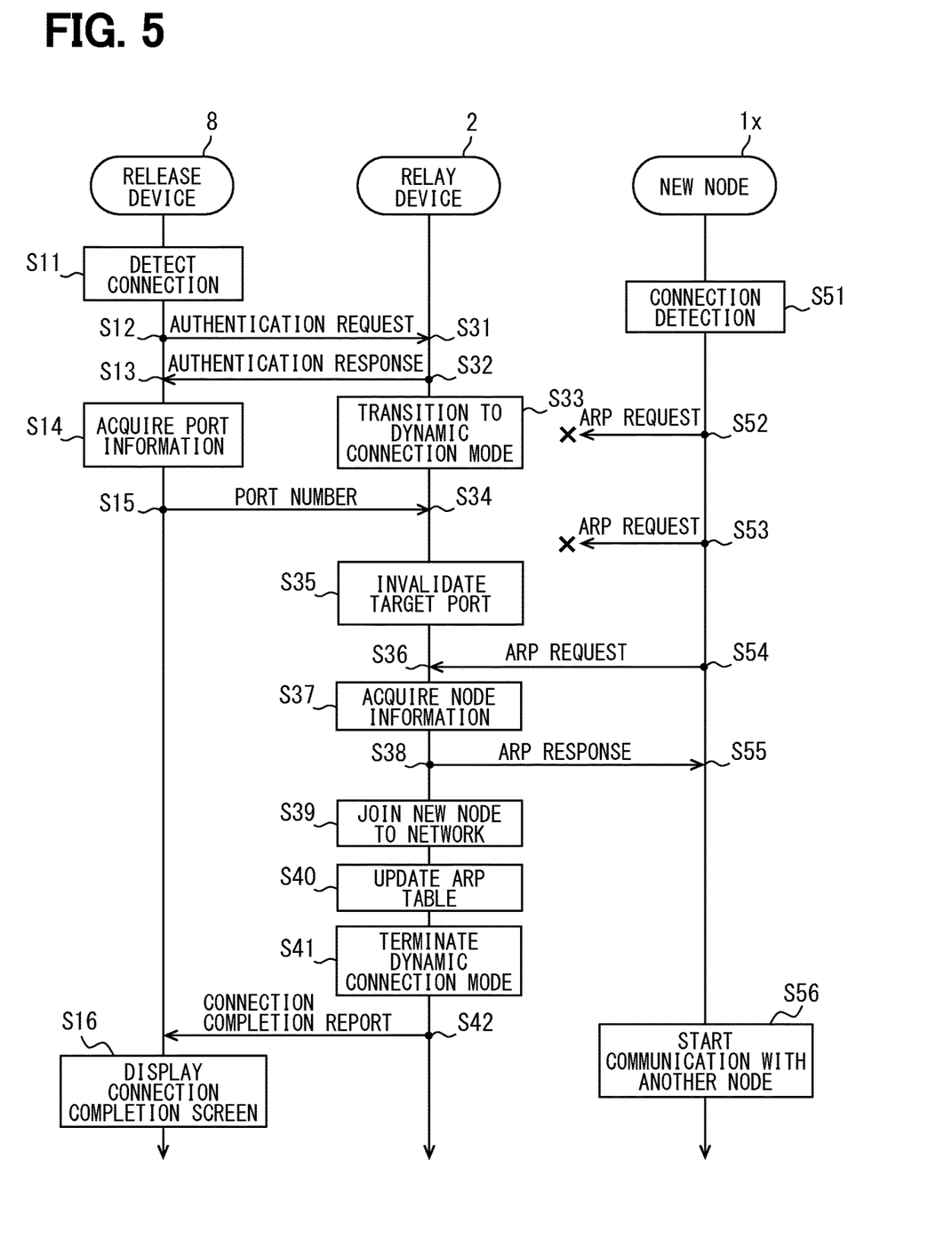
FIG. 5 is a sequence diagram showing a processing procedure for joining a new node to an in-vehicle network.

Next, the operations for joining the new node 1x, which is an unregistered node, to the in-vehicle network via the relay device 2 will be described with reference to the sequence diagram shown in FIG. 5. For convenience, a series of processes executed by the relay device 2 in order to join the new node 1x to the in-vehicle network is referred to as a network configuration change processing. The sequence diagram of FIG. 5 shows an exemplary flow from the physical connection of the release device 8 to the release device port 4 to a state in which the new node 1x joins the in-vehicle network and is capable of communicating with the other node 1.

At the start of this flow, the relay device 2 is operating in the secure mode. S11 to S16 shown in FIG. 5 are performed by the release device 8, and S31 to S42 are performed by the relay device 2 (mainly by the microcomputer 6). S51 to S56 are performed by the new node 1x.

First, when the release device 8 is wiredly connected to the release device port 4 of the relay device 2 based on the operation by the operator, the release device 8 detects the connection to the relay device 2 (S11). Then, the release device 8 transmits a signal (hereinafter, an authentication request signal) requesting the relay device 2 to perform the authentication process (S12). When the relay device 2 receives the authentication request signal from the device (substantially the release device 8) connected to the release device port 4 (S31), the relay device 2 communicates with the connected device and confirm whether the connected device is the release device 8 (that is, authenticates the connected device).

For example, the tool authentication unit F1 transmits a code (so-called challenge code) using a random number to the connected device and causes the connected device to return the response code. The response code is a code obtained by performing a predetermined arithmetic process on the challenge code for the connected device. Then, the tool authentication unit F1 determines whether the connected device is the release device 8 by comparing the response code returned from the connected device with a check code separately generated by the relay device 2.

When the tool authentication unit F1 determines that the connected device is the release device 8, the tool authentication unit F1 transmits an authentication response signal indicating that the authentication has succeeded to the release device 8 as the connected device (S32). When the tool authentication unit F1 determines that the connected device is the release device 8, the mode change unit F2 switches the operation mode of the relay device 2 from the secure mode to the dynamic connection mode, the relay device 2 waits for an instruction from the release device 8 (S33). When the tool authentication unit F1 fails the authentication with the connected device, the relay device may transmit an authentication response signal indicating that the authentication has failed to the connected device.

When the release device 8 receives the authentication response signal from the relay device 2 (S13), the release device 8 acquires the number of the port 3 for connecting the new node (hereinafter, the connection port number) based on the operation by the operator (S14). For example, the release device 8 displays a node connection screen in response to reception of the authentication response signal from the relay device 2. The node connection screen is capable of designating the number of the port 3 to which the node is connected.

When the release device 8 acquires the connection port number based on the operation of the operator, the release device 8 transmits the connection port number to the relay device 2 (S15). The relay device 2 acquires the connection port number transmitted from the release device 8 (S34). The configuration of the relay device 2 (for example, the microcomputer 6) that performs the process of S34 corresponds to a target port acquisition unit. Then, the ACL change unit F3 invalidates the access control rule for the port 3 (hereinafter, the target port) corresponding to the connection port number (S35). Specifically, the access control rule with rule ID=99, that is, a rule for passing all communication frames (hereinafter, all permission rule) is applied to the target port.

Figure 6:
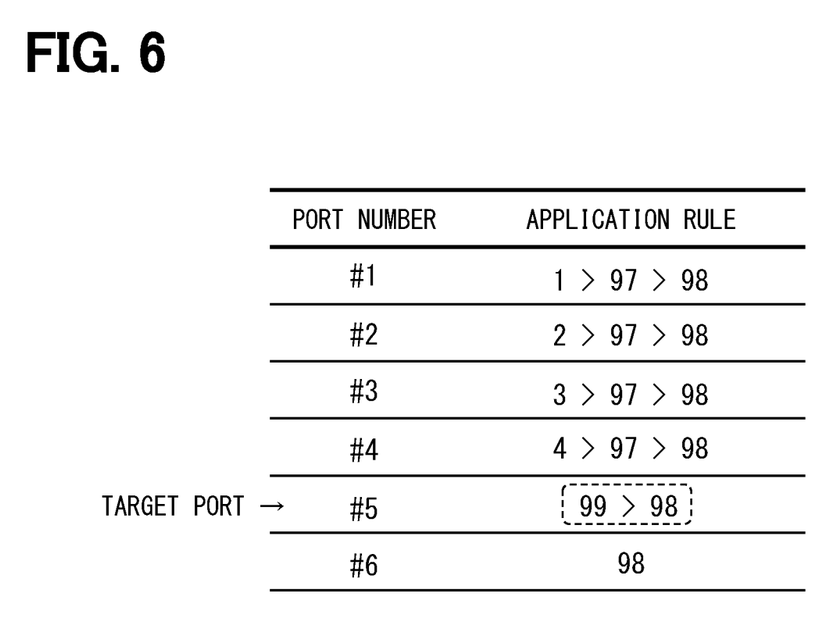
FIG. 6 is a diagram showing an operation example of an ACL change unit in S35.
Figure 7:
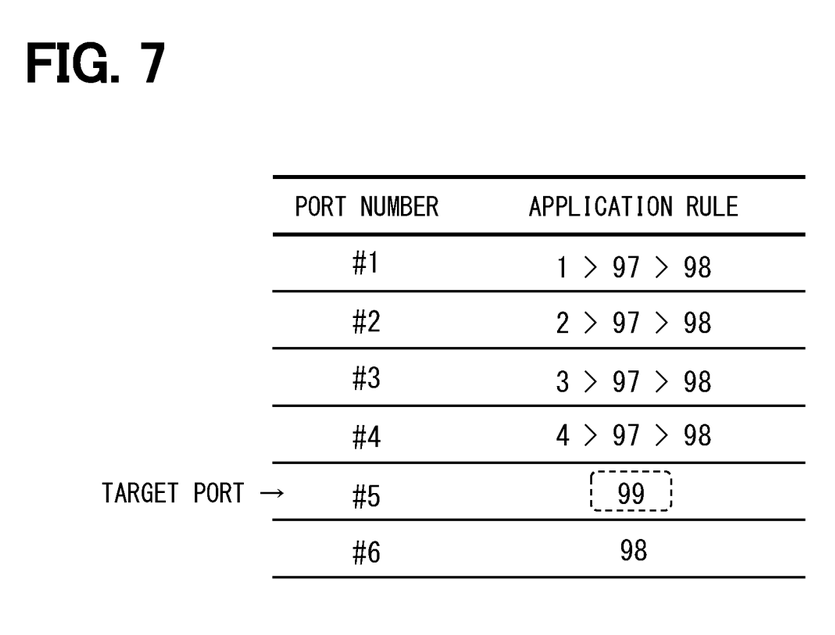
FIG. 7 is a diagram showing another operation example of an ACL change unit in S35.

For example, when the fifth port 35 is designated as the target port, as shown in FIG. 6, all permission rule (ID=99) is set for the fifth port. All permission rule may take precedence over all denial rule (ID=98). Also, all denial rule does not necessarily have to be retained. As shown in FIG. 7, the all denial rule may be canceled for the fifth port as the target port. The broken lines in FIGS. 6 and 7 indicate the changes from FIGS. 3 and 4. The process of S35 corresponds to the process of easing the condition of the node connected to the relay device 2 for the target port. Thus, hereinafter, the process in S35 is also referred to as a connection condition easing process. The configuration of the relay device 2 (for example, the microcomputer 6) that performs the process of S35 corresponds to a connection condition easing unit. The connection condition easing process of the present embodiment corresponds to a process of invalidating the condition of the node connected to the target port.

The connection condition easing process causes the relay device 2 to be able to communicate with the new node 1x via the target port. Hereinafter, the operation of each configuration will be described by taking as an example the case where the new node 1x is connected to the fifth port 35 of the relay device 2. The state in which the access control rule is invalid corresponds to the state in which a communication frame from any node can be received. For the port 3 other than the target port (for example, the sixth port 36), the normal access control rule is maintained.

When the new node 1x is connected to the fifth port 35 as the target port by the operator, the new node 1x detects the connection to the relay device 2 based on the signal input from the communication cable 9 (S51). Then, the new node 1x periodically transmits an ARP request to the relay device 2 (S52 to S54). The ARP request is a signal requesting a node having a predetermined IP address to return a MAC address. Any address value may be set as the destination IP address. The ARP request includes the MAC address of the new node 1x that is the source. A detailed description of ARP will be omitted here.

Here, as an example, it is assumed that the transmission of the ARP request in S52 and S53 is performed before the process of S35 is performed, and the transmission of the ARP request in S54 is performed after the process of S35 is performed. Until the access control rule of the target port is invalidated in S35, the communication frame transmitted from the new node 1x is discarded based on the access control rule preset for the target port such as the all denial rule. That is, the ARP request issued in S52 or S53 is not received by the relay device 2.

On the other hand, the ARP request issued in S54 after S35 is received by the relay device 2. When the relay device 2 receives the ARP request from the new node 1x (S36), the relay device 2 acquires information related to the new node (hereinafter, new node information) based on the ARP request (S37). The new node information is, for example, the MAC address of the new node 1x. The new node information may also include information such as the IP address of the new node 1x. When the relay device 2 receives the ARP request from the new node 1x, the relay device 2 returns a response frame for the ARP request (so-called ARP response) (S38).

Figure 8:
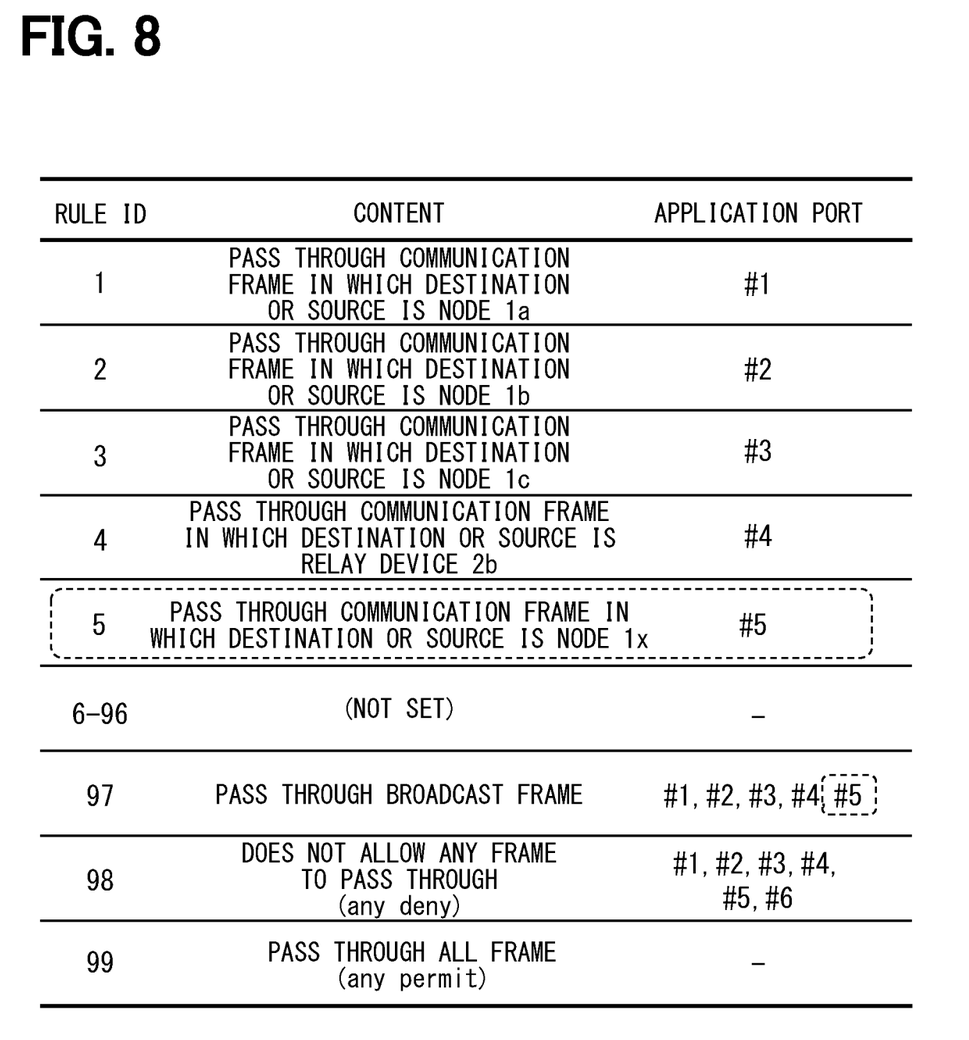
FIG. 8 is a diagram showing an example of the ACL after completion of network joining processing.

Further, the relay device 2 performs a network joining process, which is a process for joining the new node 1x to the in-vehicle network, using the new node information acquired in S37 (S39). Specifically, first, as shown in FIG. 8, the ACL change unit F3 registers an access control rule for passing a communication frame in which a destination or source is the new node 1x as rule ID=5 in the ACL. Then, the rule is applied to the fifth port 35 as the target port. Further, the broadcast passing rule (ID=97) and the all denial rule (ID=98) are applied to the fifth port 35 similarly to the first port 31 and the like. In addition, the application of all permission rule to the fifth port 35 is canceled.

Figure 9:
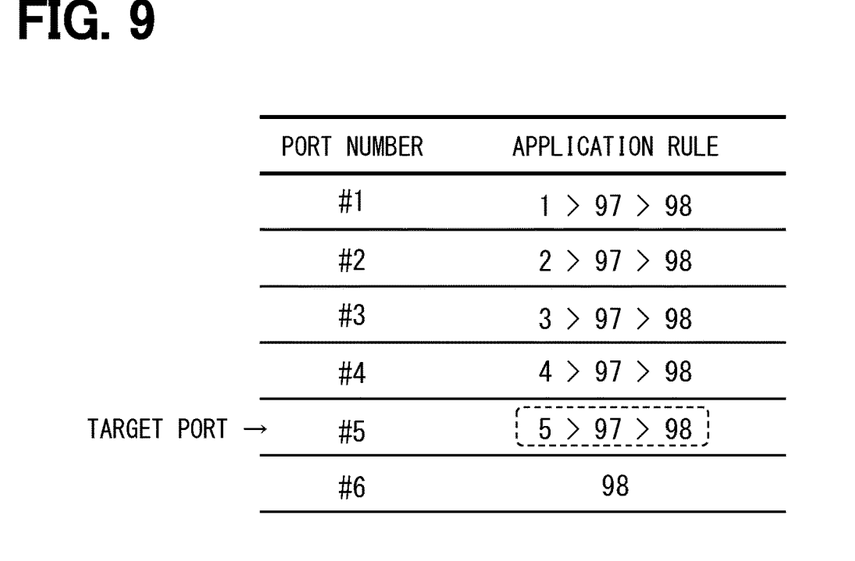
FIG. 9 is a diagram showing an application rule for each port after completion of network joining processing.

As a result of the above processes, the ACL included in the relay device 2 is updated to an ACL in which the fifth port 35 is a port 3 to which the new node 1x can be connected, as shown in FIG. 9. In addition, the relay device 2 updates the address table used for the switching process in the second layer as the network joining process. That is, the MAC address of the new node 1x is registered as the MAC address of the node 1 connected to the fifth port 35. The broken lines in FIGS. 8 and 9 indicate the changes from FIGS. 3 and 4. The configuration of the relay device 2 (for example, the microcomputer 6) that performs the process of S39 corresponds to a node addition processing unit.

Further, the relay device 2 updates the ARP table based on the new node information acquired in S37 (S40). Specifically, the IP address of the new node and the MAC address (in other words, the physical address) are associated and registered in the ARP table. The update of the ARP table corresponds to the process of updating the data (so-called ARP cache) indicating the correspondence between the IP address and the MAC address identified by the ARP.

The process of S40 may be performed earlier than the process of S39 (for example, immediately after S38). The order for performing each process shown in FIG. 5 is an example and can be changed as appropriate. The ARP table, the ACL, and the address table updated by the above processes are promptly reflected in the register that defines the operation mode of the relay processing unit 5. As a result, the relay processing unit 5 is capable of receiving and relaying the communication frame from various nodes 1 including the new node 1x based on the updated ACL, the address table, and the like.

When the above series of processes are completed, the mode change unit F2 switches the operation mode of the relay device 2 from the dynamic connection mode to the secure mode (S41). Then, the relay device 2 transmits a signal (hereinafter, connection completion report) indicating that the registration of the new node 1x is completed to the release device 8 (S42). The connection completion report may include the new node information such as the MAC address acquired in S37.

When the release device 8 receives the connection completion report from the relay device 2, the release device 8 displays a connection completion screen indicating that the connection of the new node 1x to the in-vehicle network is completed on the display (S16). The connection completion report may include new node information. According to such a configuration, the information of the new node 1x connected to the target port is displayed. Thus, the operator can confirm that the planned node is normally connected. When the network joining process in the relay device 2 and the update of the ARP table are completed, the new node 1x starts communication with another node 1 via the relay device 2 (S56).

(Summary of Embodiment)

In the above embodiment, the relay device 2 basically inhibits connection with an unregistered node using the ACL. That is, the relay device 2 communicates with the node 1 registered for each port 3. When the release device 8 is connected to the release device port 4, the relay device 2 transitions to an operation mode in which an unregistered node can connect to the in-vehicle network via a predetermined target port (that is, the dynamic connection mode).

In the dynamic connection mode, the relay device 2 identifies the target port to which the new node 1x is connected via the release device 8 and changes the access control rule for the target port in order to receive the communication frame form the new node 1x. Next, the information of the new node 1x is acquired by communicating with the new node 1x via the target port, and the content of the ACL is changed for the target port to be the port 3 that can connect the new node 1x. That is, the new node 1x is registered as a connection permission node of the target port. Then, when the above processing is completed, the relay device 2 terminates the dynamic connection mode and starts operating as the secure mode.

The configuration can connect a new node to the in-vehicle network while ensuring the security of the in-vehicle network. Further, after the operator who connects the new node inputs the connection port number in a state where the new node and the release device 8 are connected to the relay device 2, the configuration can automatically updates the ACL or the like in the relay device 2. Thus, the configuration can suppress the number of operations of the operator, reduce the burden of the operator, and improve the work efficiency. Further, since the ACL is automatically changed when the new node 1x joins the in-vehicle network, the configuration can reduce the possibility of human error such as a MAC address input error.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is referred to, the configuration of the embodiment described above can be applied to other parts.

(First Modification)

Figure 10:
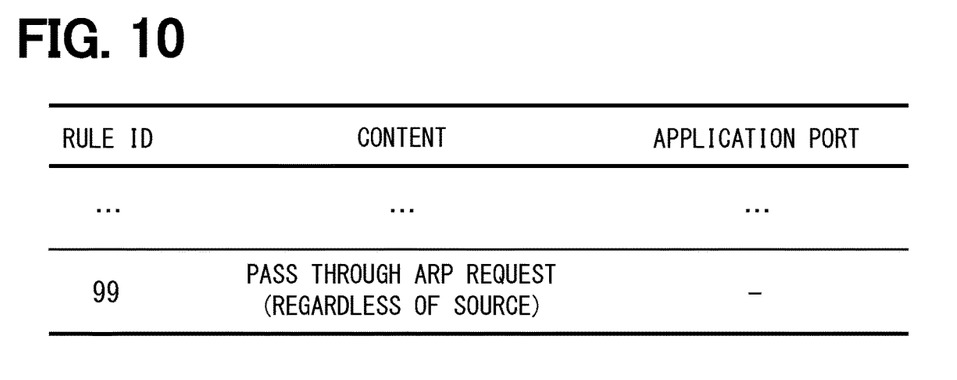
FIG. 10 is a diagram showing a modified example of connection condition easing process.

In the above-described embodiment, the connection condition easing process (S35) can cause the relay device 2 to receive the communication frame transmitted from the new node 1x by temporarily applying the all permission rule (ID=99) to the target port. However, the configuration is not limited thereto. The connection condition easing process may be a process of applying an access control rule that passes a specific communication frame capable acquiring new node information instead of the all permission rule. For example, as shown in FIG. 10, the connection condition erasing process may be an access control rule that is applied to the target port and passes the ARP request instead of the all permission rule.

Figure 11:
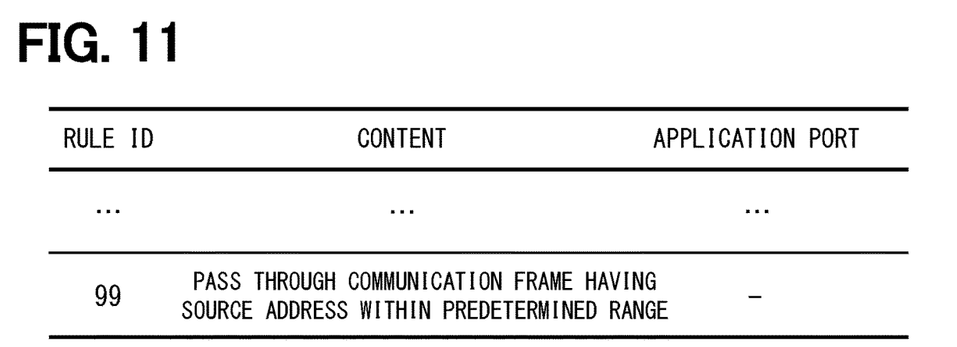
FIG. 11 is a diagram showing a modified example of connection condition easing process.

Further, the connection condition erasing process may be an access control rule that limits the attributes of the new node 1x that can be connected to the relay device 2 to some extent instead of the all permission rule. For example, the access control rule may be passes the communication frame whose source MAC address falls within a specific range. In this case, as shown in FIG. 11, the configuration may register the access control rule that passes through the communication frame whose source MAC address falls within a specific range in advance. Further, the connection condition erasing process may be a process in which an access control rule that passes a communication frame having a specific value of the upper 24 bits of the source MAC address. The access control rule temporarily applied to the target port as the connection condition easing process may pass the communication frame from a device generated by a specific vendor.

(Second Modification)

In the above-described embodiment, the relay device 2 acquires the new node information by receiving the ARP request transmitted from the new node 1x, however the type of the communication frame for acquiring the new node information is not limited thereto. Any communication node that includes the new node information can be used as appropriate. For example, a RARP (Reverse Address Resolution Protocol) request, a DISCOVER frame of DHCP (Dynamic Host Configuration Protocol), a REQUEST frame, or the like may be used.

(Third Modification)

The ACL and the access control rule may indicate a condition for a communication packet that passes through the relay device 2 or a condition for a communication packet that does not pass through the relay device 2. For example, the access control rule may pass a communication frame in which the destination or source IP address has an address value assigned to the connection permission node. The present disclosure is applicable to filtering of communication frame in the second layer or filtering of communication packet in the third layer. The above communication frame can be replaced with a communication packet.

In the embodiment in which the present disclosure is applied to the filtering of the communication frame in the second layer, the relay processing unit 5 identifies whether a node connected to each port 3 is the connection permission node using the source MAC address included in the communication frame. In the embodiment in which the present disclosure is applied to the filtering of the communication frame (s the communication packet) in the third layer, the relay processing unit 5 identifies whether a node connected to each port 3 is the connection permission node using the source IP address included in the communication frame. The source IP address and the source MAC address are addresses indicating the source. The source address described in the drawing may be a source IP address or a source MAC address. Similarly, the destination address may be a destination IP address or a destination MAC address.

(Fourth Modification)

When the ARP request is not received from the new node 1x even after the predetermined standby time has elapsed since the connection condition easing process was executed in S35, the relay device 2 determines that the timeout has occurred and resets the connection condition of the target port. Resetting of the connection condition of the target port indicates returning to the state before the release device 8 is connected. A case where the ARP request is note received from the new node 1x includes a case where a correct ARP frame is not received.

When the connection condition of the target port is reset due to the timeout, the relay device 2 may output a predetermined connection error signal to the release device 8. The connection error signal is, for example, a signal indicating that the signal from the new node 1x could not be received. When the release device 8 receives the connection error signal, the release device 8 may display an error notification screen indicating that the relay device 2 cannot find the new node 1x.

(Fifth Modification)

When an error occurs in either the network subscription process or the ARP table update process, the relay device 2 determines a setting error. In this case, the relay device 2 transmits a setting error signal to the release device 8 and resets the connection condition for the target port. The connection error signal is a signal indicating that an error has occurred in the process for changing the operation setting of the relay device 2. When the release device 8 receives the setting error signal, the release device 8 may display an error notification screen indicating that the process of registering the new node 1x as the connection permission node of the target port has failed due to an unexpected error.

When an error occurs in either the network subscription process or the ARP table update process, the relay device 2 determines a setting error. In this case, the relay device 2 may repeat the network joining process and the ARP table update for a certain number of times.

Means and/or functions provided by the relay device 2 may be provided by software recorded in a substantive memory device and a computer that can execute the software, software only, hardware only, or some combination of them. Some or all of the functions of the relay device 2 may be realized as hardware. A configuration in which a certain function is realized as hardware includes a configuration in which the function is realized by use of one or more ICs or the like. For example, when a part of the functions or all of the functions of the vehicle relay device 2 is provided by an electronic circuit being hardware, it may be possible to provide it by a digital circuit including multiple logic circuits or analog circuits.

What is claimed is:

1. A vehicle relay device comprising:
a plurality of communication ports each configured to communicate with a communication device as a node in accordance with the in-vehicle Ethernet standard, wherein each communication port of the plurality of communication ports has an associated connection permission node that is authorized for communication with the associated communication port;
a relay processing unit configured to communicate with the connection permission node associated with each communication port of the plurality of communication ports and to not communicate with an unregistered node that is connected to one of the communication ports and not registered as the connection permission node for the communication port to which the unregistered node is connected;
a release device port configured to be wiredly connected with an Ethernet communication cable to a release device;
a release authentication unit configured to, in response to detecting that a connection device has been wiredly connected to the release device port, receive an authentication request signal from the connection device, transmit a challenge code to the connection device in response to receiving the authentication request signal from the connection device, and to authenticate that the connection device is the release device based on comparing a check code with a response code returned from the connection device in response to the challenge code;
a target port acquisition unit configured to, in response to the connection device being authenticated as the release device, acquire, from the release device, a number for a target port of the plurality of communication ports to which a new node is to be connected;
a connection condition easing unit configured to, in response to receiving the number for the target port and to the connection device being authenticated as the release device, change an operation setting of the relay processing unit for communicating with the new node via the target port; and
a node addition processing unit configured to acquire information on the new node by communicating with the new node via the target port, and to register the new node as the associated connection permission node for the target port.

2. The vehicle relay device according to claim 1, further comprising
an access control list storage unit configured to store an access control list that indicates a passage condition for a communication frame passing through one of the plurality of communication ports, wherein
the access control list includes the passage condition for each of the plurality of communication ports which indicates the connection permission node for each of the plurality of communication ports, and the node addition processing unit registers the new node as the connection permission node for the target node by changing the access control list.

3. The vehicle relay device according to claim 1, wherein even when the release authentication unit determines that the release device is connected to the release device port, the plurality of communication ports other than the target port does not receive the communication frame from the unregistered node.

4. The vehicle relay device according to claim 1, wherein:
the relay processing unit identifies whether a node connected to one of the plurality of communication port is the connection permission node using a source MAC address included in the communication frame.

5. The vehicle relay device according to claim 1, wherein:
the relay processing unit identifies whether a node connected to one of the plurality of communication port is the connection permission node using a source IP address included in the communication frame.

6. A vehicle relay device comprising;
a plurality of communication ports each configured to communicate with a communication device as a node in accordance with the in-vehicle Ethernet standard, wherein each communication port of the plurality of communication ports has an associated connection permission node that is authorized for communication with the associated communication port;
a relay processor configured to communicate with the connection permission node associated with each communication port of the plurality of communication ports and to not communicate with an unregistered node that is connected to one of the communication ports and not registered as the connection permission node for the communication port to which the unregistered node is connected;
a release device port configured to be wiredly connected with an Ethernet communication cable to a release device; and
a microcomputer configured to:
receive, in response to detecting that a connection device has been wiredly connected to the release device port, an authentication request signal from the connection device, transmit a challenge code to the connection device in response to receiving the authentication request signal from the connection device, and authenticate that the connection device is the release device based on comparing a check code with a response code returned from the connection device in response to the challenge code;
acquire, in response to the connection device being authenticated as the release device, from the release device, a number for a target port of the plurality of communication ports to which a new node is to be connected;
change, in response to receiving the number for the target port and to the connection device being authenticated as the release device, an operation setting of the relay processor for communicating with the new node via the target port;
acquire information on the new node by communicating with the new node via the target port; and
register the new node as the associated connection permission node for the target port.

* * * * *